United States Patent
Ingelman et al.

(10) Patent No.: US 10,011,947 B2
(45) Date of Patent: Jul. 3, 2018

(54) METHOD AND APPARATUS FOR OBTAINING STRONG WHITE LIQUOR AND LIME MUD WITH LOW RESIDUAL ALKALI LEVEL

(75) Inventors: Magnus Ingelman, Karlstad (SE); Eva Hogebrandt, Karlstad (SE); Roger Jansson, Karlstad (SE)

(73) Assignee: Valmet AB, Sundsvall (SE)

( * ) Notice: Subject to any disclaimer, the term of this patent is extended or adjusted under 35 U.S.C. 154(b) by 737 days.

(21) Appl. No.: 14/412,822

(22) PCT Filed: Jul. 9, 2012

(86) PCT No.: PCT/SE2012/000106
§ 371 (c)(1),
(2), (4) Date: Jan. 5, 2015

(87) PCT Pub. No.: WO2014/011089
PCT Pub. Date: Jan. 16, 2014

(65) Prior Publication Data
US 2015/0225895 A1    Aug. 13, 2015

(51) Int. Cl.
*D21C 11/00* (2006.01)
*B01D 33/21* (2006.01)
*D21C 11/04* (2006.01)

(52) U.S. Cl.
CPC .......... *D21C 11/0071* (2013.01); *B01D 33/21* (2013.01); *D21C 11/00* (2013.01); *D21C 11/04* (2013.01); *Y02P 40/44* (2015.11)

(58) Field of Classification Search
USPC ........................................................ 162/30.1
See application file for complete search history.

(56) References Cited

U.S. PATENT DOCUMENTS 8,002,994 B2    8/2011    Engdahl

FOREIGN PATENT DOCUMENTS

| SE | WO2005100681 | 10/2005 |
| WO | WO9417893 | 8/1994 |
| WO | WO2011078749 | 6/2011 |
| WO | WO2012065820 | 5/2012 |

*Primary Examiner* — Jacob T Minskey
(74) *Attorney, Agent, or Firm* — Fasth Law Offices; Rolf Fasth (57) ABSTRACT

The method and apparatus are for obtaining strong white liquor and lime mud with low residual alkali content from causticized liquor. The first filter ($F_{WL}$) receives causticized liquor from causticizing vessels ($CT_1$-$CT_2$-$CT_3$) and is designed as pressurized two stage disc filter with 2 separate vat parts. In the first vat part non-diluted white liquor is obtained as a filtrate from the causticized liquor. The first lime mud cake accumulated on the filter discs in the first vat part is scraped off and diluted before being fed to the second vat part. In the second vat part weak liquor is obtained as a filtrate from the re-slurried first lime mud cake. The second lime mud cake accumulated on the filter discs in the second vat part is washed before being scraped off and diluted before being fed to subsequent lime mud handling.

7 Claims, 4 Drawing Sheets

METHOD AND APPARATUS FOR OBTAINING STRONG WHITE LIQUOR AND LIME MUD WITH LOW RESIDUAL ALKALI LEVEL

PRIOR APPLICATION

This application is a U.S. national phase application based on International Application No. PCT/SE2012/000106, filed 9 Jul. 2012.

FIELD OF THE INVENTION

The present invention relates to a method and apparatus for obtaining strong white liquor and lime mud with low residual alkali content from causticized liquor emanating from causticizing vessels in the recovery process of a pulp mill, which vessels are preceded by addition of burnt lime to green liquor thereby starting the causticizing reactions in said vessels.

BACKGROUND OF THE INVENTION

In the recovery process of a pulp mill, green liquor is formed partly by dissolving and partly by dilution of the smelt obtained in the recovery boiler. The green liquor is an aqueous solution of sodium sulfides, sulfates and carbonate, The sodium carbonate in the green liquor is causticized to sodium hydroxide (white liquor) and lime mud by adding burnt lime, which sodium hydroxide is used in the cooking process.

Several separation stages are used in the processing of green liquor and white liquor. A typical set up includes a first green liquor separation unit for removing dregs in the green liquor as well as a separation unit for drying dregs, thereafter follows a white liquor filter after complete causticizing where lime mud is filtered out, obtaining a clear white liquor. The lime mud is finally washed and dewatered in order to displace residual alkali and obtain a lime mud at high dry matter content which is fed to the lime kiln in order to convert it to burnt lime, which subsequently is reintroduced into the causticizing process. The separation units used in these process positions, mainly filters, could be of different kinds, i.e. disc filters, drum filters, sedimentation vessels, centrifuges or others and they could either be pressurized or atmospheric.

For final lime mud dewatering it is necessary to obtain maximum dry matter content of the lime mud and low residual alkali and sulfur content, as TRS (Totally Reduced Sulfur) emission regulations applicable for the lime kiln are strict. The residual alkali in lime mud is proportional to the amount of remaining sulfur dioxide, which is discharged in the kiln as TRS. As environmental concerns are constantly in focus; lower emissions for continued operations of the mill will be an important issue.

In order to reduce residual alkali and sulfur content in lime mud, it becomes a natural approach to add yet another wash step for the lime mud. This approach may not be feasible in all mills as available free land area for yet another washing machine is not at hand. Another approach is to integrate multiple wash stages in one wash machine. One such concept is disclosed in U.S. Pat. No. 8,002,994 where an atmospheric lime mud disc filter is designed as a 2-stage washing and thickening stage, having more filter discs in the last thickening stage. A disadvantage with this 2-stage machine is that it is complicated to operate as stages are in sequence and directly ahead of the lime kiln which must be fed with an even flow of dry lime mud in order not to cause disturbances in operation. If the lime kiln needs shutting down, it may take hours to regain stable operation, and the integrity of the lime kiln could be at risk. A solution to solve these problems with an uninterrupted feed of dry lime mud to the lime kiln is shown in WO2011/078749 where instead the lime mud filter is designed as 2 stages in parallel. By parallel operations of 2 stages, one stage can always be in operation, while the other may call for a clean-out process, which may require a considerable down time of this stage.

Another problem for the filters used in the recovery process is the residual alkali content in slurries, including the content of thiosulfate, which is corrosive and dictates what material must be used in these filters. The first white liquor filter handles slurries with high alkali content and must use expensive high-alloy stainless steel, while the lime mud thickening stage may use less expensive low-alloy stainless steel. In the first lime mud wash after the white liquor filter, considerable levels of residual alkali could still be at hand. If some disturbance occurs in the operations of the white liquor filter, residual alkali levels could increase abruptly and during a limited time expose the next filter stage as well to high alkali levels.

Figure 1:
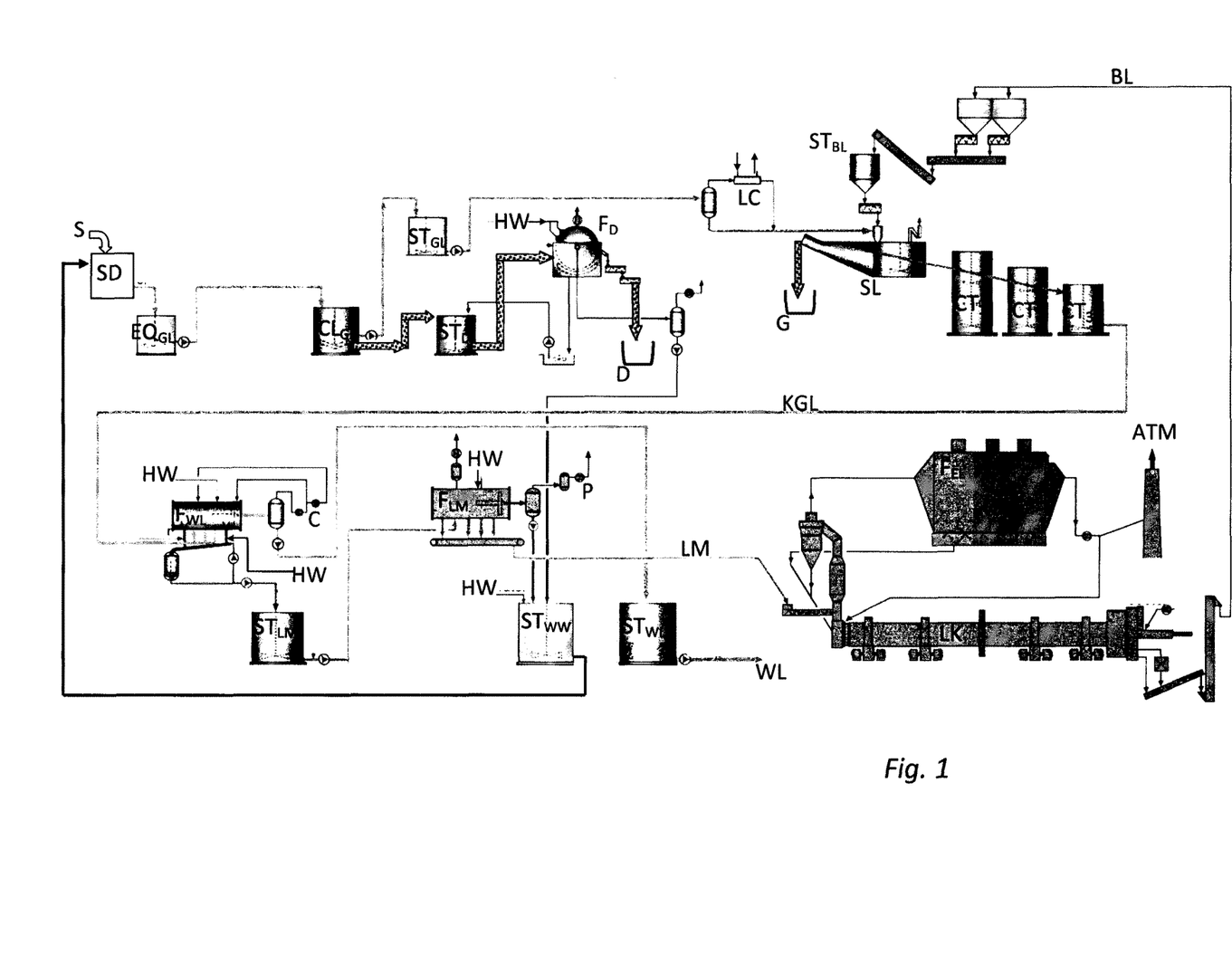
FIG. 1 Show the principal process stages of a recovery process in the causticizing plant.

In FIG. 1 is shown the principal process stages of a recovery process in the causticizing plant. Smelt S from the recovery boiler is the input flow to the process and the produced white liquor WL is the output flow from the process. The smelt is added to a smelt dissolver SD during addition of weak white liquor WW from a storage tank $ST_{WW}$, and the formed solution is called green liquor and is sent to an equalizing tank $EQ_{GL}$. From this equalizing tank it is pumped to a separation process, here a clarifying vessel $CL_{GL}$, where dregs and particles settle in the bottom. The dregs are forwarded to a dregs storage tank $ST_D$ before being forwarded to dregs washing, here dregs filter $F_D$. The dregs is washed out by adding hot water HW and scraped off from the dregs filter to a dregs container D, and is most often sent to landfill or other destruction. The filtrate from the dregs filter $F_D$ contains washed out alkali at low concentration and is sent to the weak white liquor storage tank $ST_{WW}$. The clarified green liquor is pumped from the clarifying vessel $CL_{GL}$ to a green liquor storage tank $ST_{GL}$. The temperature of the green liquor is often close to the boiling temperature of the green liquor, i.e. somewhat above 100° C., and before being fed to the slaker SL it needs cooling by a cooler LC, as the following causticizing process is exothermic in nature and boiling is not wanted. The cooled green liquor is thus added to the slaker together with addition of burnt lime from a storage bin $ST_{BL}$. The causticizing process starts in the slaker during separation of grits, i.e. not dissolved lime particles and other particles, discarded to a grit container G. The completion of the causticizing process is done in the causticizing train, i.e. a number of causticizing vessels in series, $CT_1$->$CT_2$->$CT_3$. After completion of the causticizing process the process liquor KGL typically contains 90% by weight of white liquor with an effective alkali content (NaOH) of about 100-120 g/l and 10% by weight of lime mud. The causticized process liquor KGL is therefore sent to the pressurized white liquor filter $F_{WL}$, where a clear white liquor is obtained and sent to a storage tank $ST_{WL}$ for strong white liquor. The gas phase of this filter is pressurized by mill air PMA and subsequently recirculated through the filter shaft to a separator and through compressor C to create a filtration force over the filter elements. A lime mud cake is formed on the filter elements and washed with hot water HW, which reduce residual alkali levels in the lime mud cake. The lime mud cake obtained in the white liquor filter $F_{WL}$, is diluted and sent to a storage tank $ST_{LM}$ for lime mud. In order to drain or wash out more residual alkali in the lime mud, the lime mud is sent to a lime mud filter $F_{LM}$. The filtrate side of the lime mud filter $F_{LM}$ is set under vacuum by evacuation pump P connected to the gas phase of the weak liquor separation tank on the filtrate side. In this lime mud filter the main objective is to increase dry matter content of the lime mud before it is sent to the lime kiln LK; typically the dry matter content is in the range 70-80%, but as indicated in FIG. 1 this lime mud filter may also perform some washing by addition of hot water HW. The dried lime mud LM is directly sent to the lime kiln LK in order to convert it to burnt lime BL which is returned to the process and the storage bin $ST_{BL}$. The filtrate from the lime mud filter $F_{LM}$ is sent to the weak white liquor storage tank $ST_{WW}$.

Figure 2:
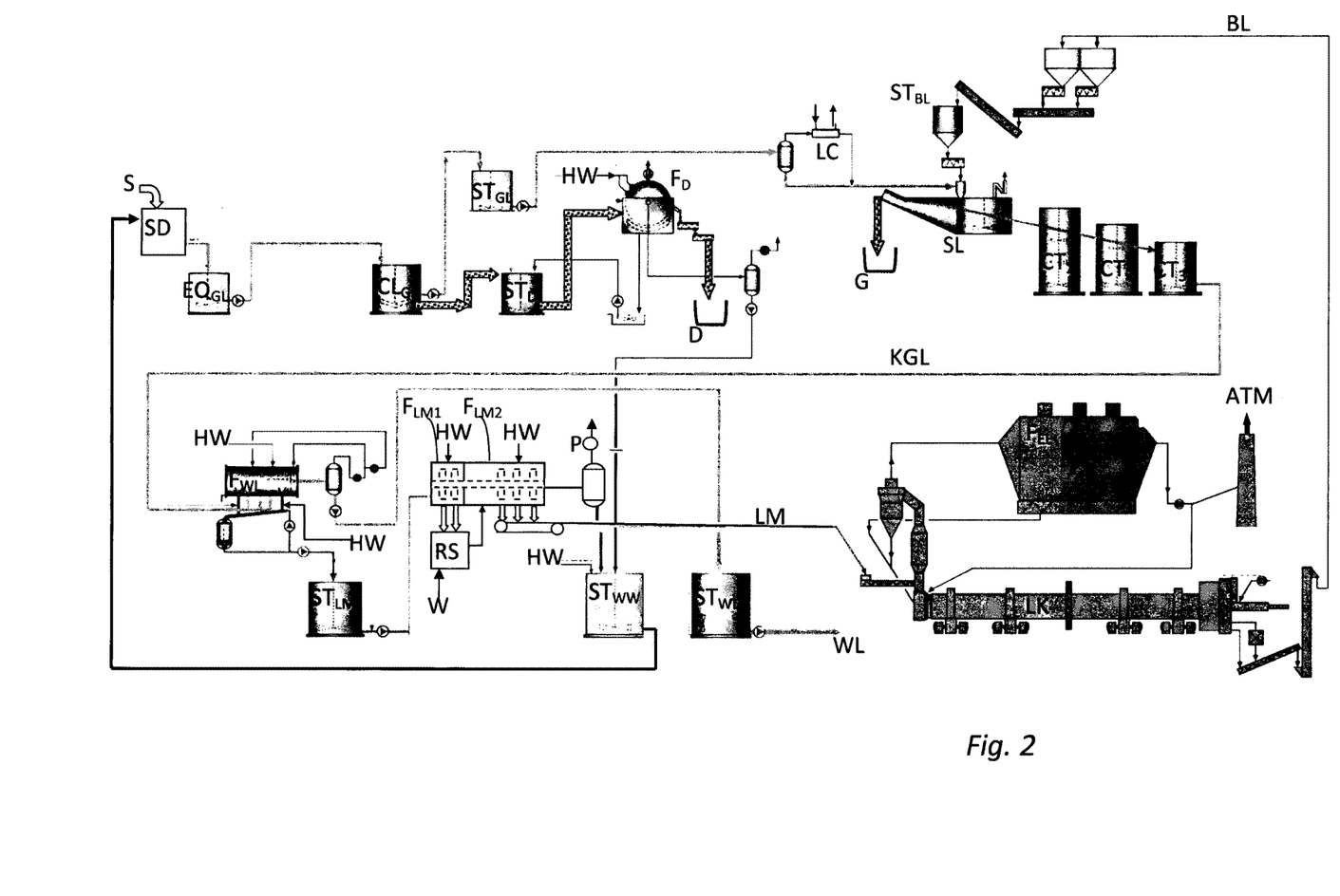
FIG. 2 show an alternative of FIG. 1, but with the lime mud thickening stage replaced with a 2-stage lime mud filter according to U.S. Pat. No. 8,002,994.

In FIG. 2 is the principle process stages of FIG. 1 modified by using a 2-stage lime mud filter reassembling the type of filter disclosed in U.S. Pat. No. 8,002,994. In the first stage $F_{LM1}$ of this lime mud filter, lime mud is dewatered and washed, subsequently the lime mud cake from this stage is reslurried in a tank RS while adding dilution water, and this lime mud slurry is fed to second stage $F_{LM2}$ where it is thickened to appropriate dryness.

SUMMARY OF THE INVENTION

According to the invention it has been realized that if additional wash stages are to be used in the causticizing process in order to reduce emissions from the lime kiln it is better to add this additional wash stage immediately after the white liquor filtering process. If the first filter fed with hot causticized liquor, i.e. the white liquor filter, is designed as a 2-stage pressurized filter with only thickening in a first stage, and thickening and washing in a second stage, non-diluted hot white liquor can be obtained from the first stage, and lime mud with surprisingly low residual alkali content in a second stage due to efficient washing. The reason for this improvement is that the usage of a pressurized filter in stage 2 enable higher filter load on filter media, i.e. higher pressure during lime mud washing and thickening maintains a higher slurry temperature by the resulting increased boiling temperature, thus reducing viscosity of the slurry. The temperature of the causticized liquor pumped from the causticizing vessels is typically in the range of 95-100° C. as the reactions are exothermic. If this temperature could be maintained in the strong white liquor, further heating of this white liquor charge in the pulping process is reduced. Obtaining non-diluted hot white liquor is beneficial for the operation of the pulping process as heating requirements, i.e. steam consumption in cooking decrease and the amount of deadload in the form of excess water from the causticizing plant to the cooking plant can be reduced.

The corrosion problems could thus be handled in this first filter, using expensive high-alloy stainless steel materials, while subsequent filters may use less expensive materials.

One object of the present invention is to provide a method of extracting strong white liquor and lime mud with low residual alkali content from causticized liquor emanating from causticizing vessels in the recovery process of a pulp mill, which vessels are preceded by addition of burnt lime to green liquor thereby starting the causticizing reactions in said vessels, comprising the following steps in sequence;

the causticized liquor is fed to the first part of a vat of a pressurized disc filter wherein this first part of the vat has a first set of filter discs and a separate first filtrate reception system, thereafter extracting strong white liquor from the causticized liquor in the first filtrate reception system by passing the liquid part of the causticized liquor through filter media of the first set of filter discs, while collecting the residual lime particles of the causticized liquor as a first lime cake on the face of the filter media of the first set of filter discs and using no wash water on the formed first lime cake on the filter media, thereafter scraping off at least a part of the first lime cake from the face of the filter media on the first set of filter discs, wherein the dry matter content of the scraped off first lime cake is higher than 50 wt-% and collecting the scraped off first lime cake in a first lime cake collection system while diluting the scraped off first lime cake with a suitable low alkali liquid to a dry matter content of the diluted first lime cake slurry less than 25 wt-%;

at least a part of the diluted first lime cake slurry is fed to a second vat part of the pressurized disc filter wherein this second vat part has a second set of filter discs and a separate second filtrate reception system, thereafter extracting weak white liquor from the diluted first lime cake slurry in the second filtrate reception system by passing the liquid part of the diluted first lime cake slurry through filter media of the second set of filter discs, while collecting the residual lime particles of the diluted first lime cake slurry as a second lime cake on the face of the filter media of the second set of filter discs and using wash water on the formed second lime cake on the filter media in order to displace residual alkali in said second lime cake, thereafter scraping off at least a part of the second lime cake from the face of the filter media on the second set of filter discs, wherein the dry matter content of the scraped off second lime cake is higher than 50 wt-% and collecting the scraped off second lime cake in a second lime cake collection system while diluting the scraped off second lime cake with a suitable low alkali liquid to a dry matter content of the diluted second lime cake less than 25 wt-% and passing the diluted second lime cake slurry to at least one lime mud thickening stage before feeding the thickened lime mud to a lime kiln. By this method is a filtration process obtained with high production capacity of non diluted strong white liquor and a lime mud with low residual alkali content.

The dry matter content of the scraped off second lime mud cake is typically above 50-55% in recovery processes in pulp mills using annual plants or bamboo as the raw material for pulping, and typically above 65% when using hardwood or softwood.

According to one preferred embodiment is the method further characterized in pressurizing the pressurized disc filter with at least 0.7 bar, or preferably at least 1.0 bar, above atmospheric pressure in both the first and second vat part. By this pressurization could the inherent high temperature of the causticized green liquor be maintained and the filtration of the slurries is done at lowest possible viscosity.

According to another preferred embodiment of the method are the stages optimized for the first thickening stage and the second washing and thickening stage, where the pressurized disc filter is provided with a number of filter discs in the first set of filter discs greater than the number of filter discs in the second set of filter discs. Alternatively does the method further comprise establishment of a level of the causticized liquor in the first vat part that is higher than the level of diluted first lime cake slurry in the second vat part, thus obtaining a height difference (ΔH) between liquid surfaces in first and second vat part. Both these alternatives, number of discs and liquid level in each stage, could be used independently or combined.

According to a further embodiment of the inventive method could the extracted weak white liquor from the diluted first lime cake slurry be used as at least part of the suitable low alkali liquid used as dilution liquid diluting the scraped off first lime mud cake. The dilution liquid added in this stage is primarily used for establishment of a readily flow able state, while later washing may be done with almost pure water having no alkali content. Even if some washing effect is obtained "by dilution", some part of dilution liquid may come from this weak liquor, especially if the residual alkali level in such weak liquor is only a fraction of the alkali concentration in the causticized green liquor.

According to yet another embodiment of the inventive method could a part of the diluted first lime mud cake slurry be fed to a subsequent lime mud thickening stage before feeding the thickened lime mud to a lime kiln. This option may increase run ability of the system as excess flow from first stage may be by-passed the second stage on temporary basis.

One object of the present invention is also to provide an apparatus for extracting strong white liquor and lime mud with low residual alkali level from causticized liquor emanating from causticizing vessels in the recovery process of a pulp mill, which vessels are preceded by addition of burnt lime to green liquor thereby starting the causticizing reactions in said vessels, said apparatus comprising;

(a) a causticizing train comprising a number of causticizing vessels ($CT_1$-$CT_3$) connected in series,
(b) a pressure disc filter with a first and second vat parts (10a, 10b) separated by a wall (20) inside a pressure vessel surrounding both vat parts,
(c) said pressure disc filter having a shaft connected to drive means (M) for rotating the shaft and with at least a first and a second filtrate receiving channel (31, 32) in said shaft;
(d) a first set of filter discs (33a) connected the first filtrate receiving channel (31) and a second set of filter discs (33b) connected the second filtrate receiving channel (32), the first set of filter discs arranged in the first vat part (10a) and the second set of filter discs arranged in the second vat part (10b);
(e) a first filtrate reception tank (51) for collecting filtrate in form of strong white liquor in a first liquid and gas phase from the first filtrate receiving channel (31) and a a second filtrate reception tank (52) for collecting filtrate in a second liquid and gas phase from the second filtrate receiving channel (32);
(f) pressurizing means (C) for withdrawing gas phase from the first and second reception tanks (51, 52) and pressurize the gas phase and leading the pressurized gas phase to the first and second vat of the pressure disc filter;
(g) first pumping means ($SP_1$) for pumping the causticized liquor from the causticizing train to a first vat part of the pressure disc filter wherein this first vat part has a first set of filter discs and a separate first filtrate reception system,
(h) first scraper means (34a) for scraping off a first lime mud cake from the thickened lime mud formed on the filter discs in the first vat part while diluting the scraped off lime mud using dilution nozzles, forming a diluted first lime mud cake slurry,
(i) second pumping means ($SP_2$) for pumping at least a part of the diluted first lime mud cake slurry to a second vat part of the pressure disc filter wherein this first vat part has a second set of filter discs and a separate second filtrate reception system,
(h) washing means (WN) for washing a second lime mud cake formed on the second set of filter discs
(i) second scraper means (34b) for scraping off the washed second lime mud cake with low residual alkali level from the thickened lime mud formed on the filter discs in the second vat part while diluting the scraped off lime mud using dilution nozzles, forming a diluted second lime mud cake slurry,
(j) and third pumping means ($SP_3$) for pumping the diluted second lime cake slurry to at least one lime mud thickening stage before feeding the thickened lime mud to a lime kiln.

By this design of the apparatus in this process position is the advantages with a pressurized filter used in an optimal manner providing a reduction of TRS emissions in the flue gases from subsequent lime kiln to a greater extent than possible with an atmospheric 2-stage lime mud wash directly ahead of the lime kiln. In all essential aspects, alkali components are handled in this first process position and subsequent filters etc are only subjected to low alkali conditions and less corrosive environment.

According to one preferred embodiment of the apparatus is the number of filter discs in the first set of filter discs greater than the number of filter discs in the second set of filter discs.

According to another preferred embodiment of the apparatus is the pressurizing means consisting of one single compressor connected to the gas phase of both the first and second vat part. This simplifies the process equipment.

According to a further embodiment of the inventive apparatus, the first vat part and the second vat part are separated by a dividing wall having an open section in the upper part of the dividing wall above liquid levels established in both vat parts, thus creating a separation of liquid phases but a common gas phase for both vat parts.

According to yet another embodiment of the apparatus is a shunt line controlled by a shunt valve provided for the diluted first lime mud cake slurry, by-passing the filter discs of the second vat part.

DETAILED DESCRIPTION OF THE INVENTION

Figure 3A:
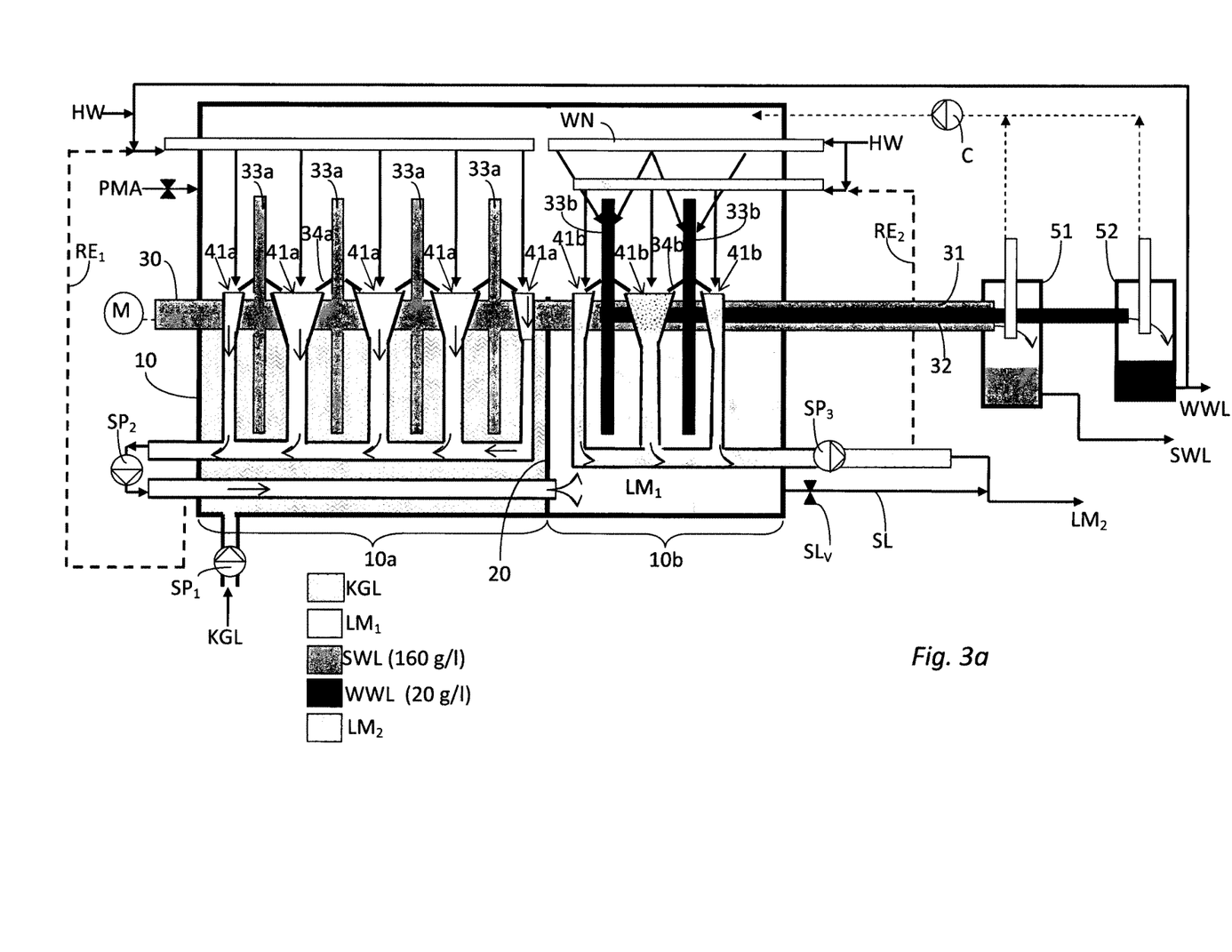
FIG. 3a show a 2-stage white liquor filter according to the invention that could replace the white liquor filter in FIG. 1 in order to reduce TRS emissions in the flue gases from the lime kiln.

In FIG. 3a is shown a 2-stage white liquor filter 10 according to the invention that could replace the white liquor filter in FIG. 1 in order to reduce TRS emissions in the flue gases from the lime kiln. The causticized green liquor KGL is fed by a slurry pump $SP_1$ to a first vat part 10a separated from a second vat part 10b by a dividing wall 20. The wall 20 may as shown extend up to the bottom part of the shaft 30 and thus form a common gas phase above the wall 20. A liquid level of causticized green liquor KGL is established below a lime mud chute opening 41a. The entire filter is pressurized by mill air PMA and a differential pressure over the filter elements is provided by a compressor C connected with the suction side to liquor separation tanks 51 and 52 and feeds pressurized gas to the gas phase of the filter as shown. In the first vat part is the shaft 30 rotated by the drive means M and thus also the filter discs connected to the shaft. The strong white liquor is filtered through the filter discs 33a and led to a first filtrate reception system, consisting of a first filtrate channel 31 in the shaft and a liquor separation tank 51. The lime mud cake accumulated on the filter discs 33a is scraped off by scraper blades 34a located immediately above the lime mud chute opening 41a, and the scraped off lime mud cake, typically holding a dry matter content between 65-85%, is simultaneously diluted by adding dilution water reaching a dry matter content well below 25 wt-%. The dilution water added at the entry of the lime chute opening 41a may be weak white liquor (WWL) or hot water HW or condensate or a mixture thereof, and may optionally be added with an amount of recirculated volume $RE_1$ of diluted lime mud cake in order to keep flow velocity high, avoid settling and provide better mixing in reception chutes. The diluted lime mud slurry $LM_1$ is then immediately forwarded to a second vat part 10b by a slurry pump $SP_2$. During the white liquor separation in the first vat part, no washing water is added on the lime mud cake formed on the filter discs, which results in non diluted strong white liquor.

In the second vat part 10b, the liquor phase with its residual content of alkali is filtered through the filter discs 33b and led to a second filtrate reception system, consisting of a second filtrate channel 32 in the shaft and a liquor separation tank 52. The lime mud cake accumulated on the filter discs 33b is first washed by a wash nozzle arrangement WN before being scraped off by scraper blades 34b located immediately above the lime mud chute opening 41b. The wash water is preferably any low alkaline wash water and preferably hot water HW. The scraped off lime mud cake, typically holding a dry matter content between 65-80 wt-%, is simultaneously diluted by adding dilution water reaching a dry matter content well below 25 wt-%. The dilution water added at the entry of the lime chute opening 41b may preferably be hot water HW or any other process liquid that do not contain alkali or sulfur that may increase TRS emissions in flue gases from the lime kiln, and may optionally be added with an amount of recirculated volume $RE_2$ of diluted lime cake in order to keep flow velocity high, avoid settling and provide better mixing in reception chutes. The diluted lime mud slurry $LM_2$ is then forwarded to the subsequent process stage, preferably a lime mud thickening stage, by slurry pump $SP_3$.

As indicated in FIG. 3a could also a shunt line SL controlled by a shunt valve $SL_V$ be connected to the second vat part 10b, enabling a by-pass of the diluted first lime mud cake slurry, by-passing the filter discs 33b of the second vat part. This by pass is preferably opened intermittently if liquid level in vat part 10b becomes excessive or if any other overloading of process capacity occurs. The main objective that most of the lime mud is thickened and thickened/washed in 2 stages may still be obtained even if some 5-10 wt-% of lime mud flow is by-passed the second stage.

As indicated in the table of FIG. 1 is typically a strong white liquor SWL obtained with an effective alkali concentration (counted as NaOH) of about 115 g/l (same as in the causticized liquor), as no washing water is used for the lime cake formed in first vat part. As the lime cake scraped off in first vat part contains residual alkali, typically some 5-10 wt-%, could weak liquor be used as dilution liquor at least in part. As indicated is typically a weak white liquor WWL obtained from second stage with an effective alkali concentration of about 15 g/l, i.e. only some 13 wt-% of the concentration in the strong white liquor. However, in the second vat part is preferably only hot water or similar low alkali liquids used as washing liquid in order to displace residual alkali from the lime cake formed in the second vat part.

Figure 3B:
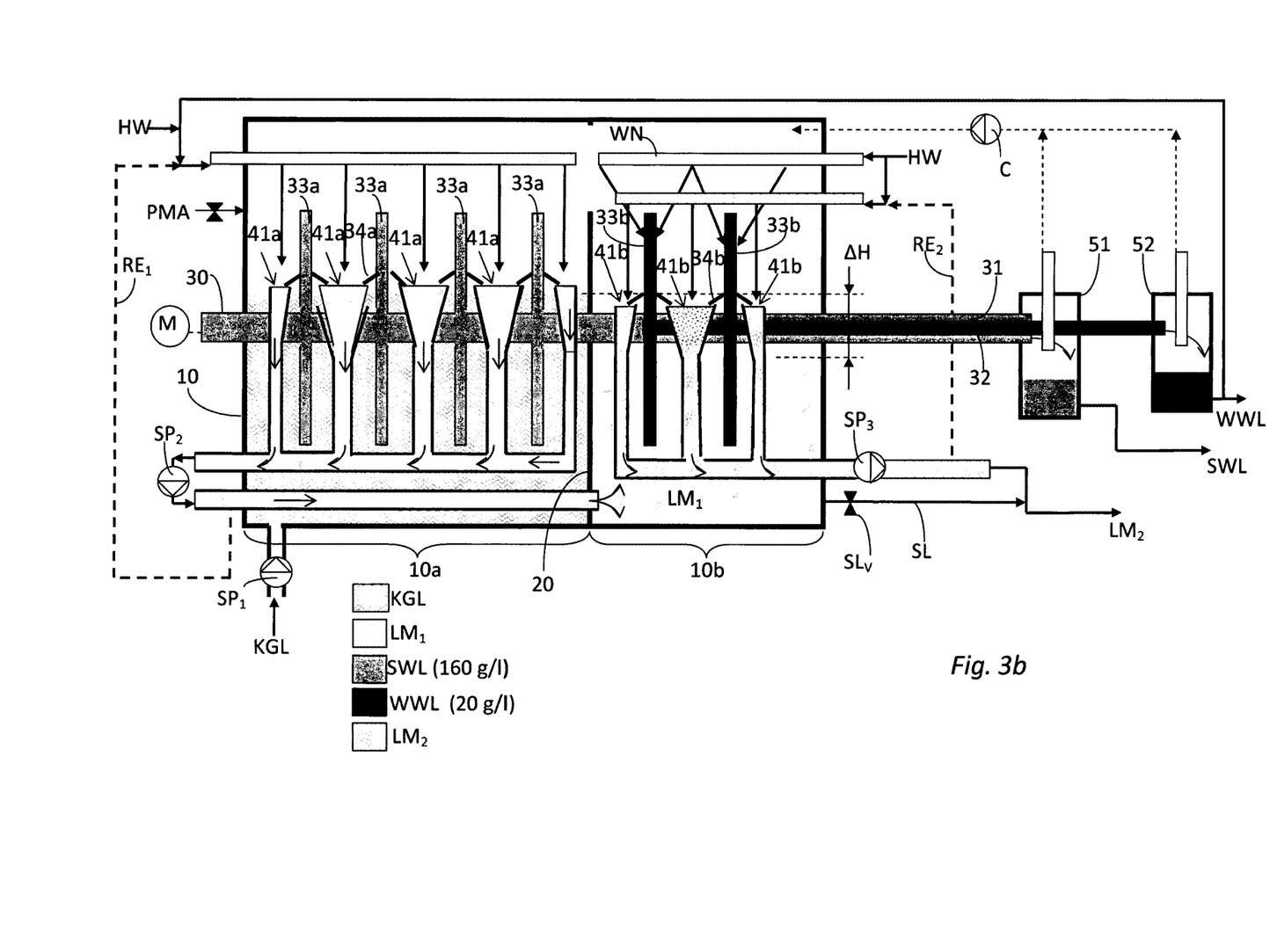
FIG. 3b show a variant of FIG. 3a where the slurry level in first and second vat parts are different, ΔH, with a lower level in $2^{nd}$ vat part.

In FIG. 3b is essentially the same 2-stage disc filter shown as in FIG. 3a, but with some modifications on how they are designed and operated. In this embodiment is shown that the liquid levels in first vat part 10a and second vat part 10b are different, i.e. that the liquid surface in first vat part 10a with causticized liquor in the first vat part that is higher than the level of diluted first lime cake slurry in the second vat part, thus obtaining a height difference ΔH between liquid surfaces in first and second vat part. There are some process advantages with this design. As the liquid level is higher in the first vat part, so the effective filtering area for strong white liquor is increased, as a larger part of the filter discs are immersed in the causticized green liquor. The higher level also gives an increased differential pressure over the discs and thus an increase in hydraulic capacity. One option is as disclosed in FIG. 3b to establish a liquid level that is above the filtrate reception channel 31 in the shaft 30, which results restricted passage of the gas phase through the filter discs and down to the liquor separation tank 51. This will reduce operating costs for the compressor C, and as the first stage is optimized for extracting strong white liquor, rather than high dryness in the lime cake, an optimum filtering capacity for strong white liquor is obtained. On the other hand, with a lower liquid level in second vat part 10b, an increased gas flow from the gas phase, through the filter discs and down to the liquor separation tank 52 is obtained. The pressurization of the entire gas phase in this design apply full pressure of the liquid level in first vat part but less gas flow, while the major part of the gas flow is established in second vat part where the displacement, i.e. washing and thickening, is sought for. As a consequence, displacement of residual alkali and wash liquid will be improved obtaining a lower level of residual alkali in the lime mud cake in the second vat part. As indicated in FIG. 3b, the dividing wall 20 in the pressure vessel is extended upwards, and a sealing is arranged around the drive shaft preventing slurries in the separate vats from migrating into the opposite vat. Such a sealing may also be provided with sealing liquid, preferably weak white liquor. Optionally the dividing wall 20 may extend all the way upwards, such that each gas phase in the separate vats are separated and may be pressurized independently from the other, this however requires more expensive design and complex control of the pressurizing means.

Tests Between Different Systems.

Different types of filtering systems according to options a)-d) have been studied as of effects on TRS emissions in flue gases from lime kiln. (TRS=Totally Reduced Sulphur). In this comparison, the same quantity and quality of causticized slurry was used, having a White Liquor content of 90 wt-% with an effective Alkali level of about 115 g/l as well as a lime mud content of 10 wt-% with normal softwood/hardwood filterability properties.

a) $WLF_P$+LMT
b) $WLF_{P\&W}$+LMt c) $WLF_{P\&W}$+LMT+LMT [according to U.S. Pat. No. 8,002,994, wherein both LMT stages are integrated in same filter apparatus]

d) $WLF_P$+$WLF_{P\&W}$+LMT [according to the invention described above wherein $WLF_P$ and $WLF_{P\&W}$ is integrated in same filter apparatus]

All filters above are disc filters with the same filter area per filter.

$WLF_P$ is a 1 stage pressurized white liquor filter without washing;

$WLF_{P+W}$ is a 1 stage pressurized white liquor filter with washing;

LMT is a 1 stage thickening filter of the vacuum type with washing.

Lime mud filters, with or without washing are conventionally vacuum type filters, while many white liquor filters are pressurized in order to maintain temperature of the white liquor and avoid boiling in the filtrate. The maximum vacuum level in atmospheric filters is practically found at some 0.2-0.3 bar (absolute) pressure, i.e. a differential pressure over filter surface of about 0.7-0.8 bar. At these low pressures in filtrates (i.e. strong or weak liquor), the liquid may start to boil if the temperature is close to boiling point. At 0.21-0.28 bar (absolute) pressure the water boils at 60.8° C. and 67.2° C. respectively. Normally the temperature is decreased well below the boiling point by adding colder dilution liquids, but this decreases filterability as viscosity decreases with temperature. In pressurized filters on the other hand, temperature in the filtrate can be kept high with no boiling as a result and thereby minimize the loss in temperature.

Option a) resulted in a residual alkali content of 6% in the lime mud from the $WLF_P$ filter at 75% dry matter content. The residual alkali content in the lime mud after the LMT thickening filter was about 0.25% at 75% dry matter content. The TRS level in the flue gases from the lime kiln was found to be in the range 7-15 mg/m³.

Option b) resulted in a somewhat lower residual alkali content of 3.5% in the lime mud from the $WLF_{P\&W}$ filter at 70% dry matter content due to washing effect. The residual alkali content in the lime mud after the LMT thickening filter was about 0.1% at 75% dry matter content. The TRS level in the exhaust gases from the lime kiln was found to be in the range 3-10 mg/m³.

Option c) resulted in a residual alkali content of 3.5% in the lime mud from the $WLF_{P\&W}$ filter at 70% dry matter content, same as in option b) in this stage. The residual alkali content in the lime mud after the first LMT thickening filter with washing was about 0.5-1% at 65% dry matter content. Finally, the residual alkali content in the lime mud after the second LMT thickening filter was about 0.01-0.05% at 75% dry matter content. The TRS level in the flue gases from the lime kiln was found to be in the range 0.5-3 mg/m³.

Option d) resulted in a residual alkali content of 6% in the lime mud from the $WLF_P$ filter at 75% dry matter content, same as in option a) in this stage. The residual alkali content in the lime mud after the $WLF_{P\&W}$ filter with washing was however surprisingly low at about 0.25-0.5% at 65% dry matter content. Even though the residual alkali level was 71% higher than after first filter stage in option c) a remarkable wash out of residual alkali was achievable in the $WLF_{P\&W}$ filter. The explanation is that the pressurized 2$^{nd}$ stage in option d) could have a higher filter load, partly because of higher differential pressure, compared with a vacuum filter, and partly because the viscosity of the lime mud slurry is lower if kept at high temperature which is possible due to the higher pressure. Finally, the residual alkali content in the lime mud after the LMT thickening filter was about half of that obtainable in option c), i.e. 0.005-0.025% at 75% dry matter content. The TRS level in the flue gases from the lime kiln was found to be in the range 0.25-1.5 mg/m³.

The results from the tests with options a to d are listed in below table;

|  | Filter Area | Dry matter % | Residual Alkali, % | TRS Lime kiln mg/m³ |
|---|---|---|---|---|
| Option a) |  |  |  |  |
| $WLF_P$ | A | 75 | 6 |  |
| Dilute To next filter |  | 10 |  |  |
| LMT | B | 75 | 0.25 | 7.0-15 |
| Option b) |  |  |  |  |
| $WLF_{P\&W}$ | A | 70 | 3.5 |  |
| Dilute To next filter |  | 10 |  |  |
| LMT | B | 75 | 0.1 | 3.0-10 |
| Option c) |  |  |  |  |
| $WLF_{P\&W}$ | A | 70 | 3.5 |  |
| Dilute To next filter |  | 20 |  |  |
| LMT (1$^{st}$) | B1 | 65 | 0.5-1 | 3.0-10 |
| Dilute To next filter |  | 10 |  |  |
| LMT (2$^{nd}$) | B | 75 | 0.01-0.05 | 0.5-3.0 |
| Option d) |  |  |  |  |
| $WLF_P$ | A | 75 | 6 |  |
| Dilute To next filter |  | 15 |  |  |
| $WLF_{P\&W}$ | A2 | 65 | 0.25-0.5 |  |
| Dilute To next filter |  | 10 |  |  |
| LMT (2$^{nd}$) | B | 75 | 0.005-0.025 | 0.25-1.5 |

Test Remarks;
All tests done with causticized green liquor, having a lime content of 10 wt-%, and effective alkali level (as NaOH) at about 115 g/l.
Filter area B1 is about the same as for A2 (for order of comparison of principles)
Filter area of B1<B, and A2<A (less number of filter discs)
In all examples is the cake after filter diluted to 10% dry matter content, except for;
i. To 1$^{st}$ LMT filter in option c;
ii. To $WLF_{P\&W}$ filter in option d
  As next filter has less filter area (B1 or A2) and hydraulic load limits lower consistency level.

The tests shows that a remarkable improvement could be obtained by simply arranging the two-stage pressure disc filter directly after the causticizing vessels, instead of arranging the two-stage atmospheric disc filter directly ahead of the lime kiln. Conventionally further lowering of emissions is rather costly when starting at an already low emission level, and costs commonly increase exponentially in proportion to further reductions in emissions. These are well known effects when reducing pollutions in any media. According to the invention a remarkable reduction of TRS emissions in the flue gases from the lime kiln could be obtained, i.e. almost 50% reduction, by replacing an existing white liquor filter with a 2-stage white liquor filter, rather than replacing an existing lime mud wash with a 2-stage lime mud wash.

The tests were made from typical green liquor from softwood pulping processes, and if other silica rich wood material is used in the pulping process, such as annual plants and bamboo etc, then other process parameters would be at hand such as higher residual alkali levels, and lower dry matter content in cakes and order of dilution to next filtering stage. Filterability of silica rich green liquors is lower, and typically the cakes has some 10-15% units lower dryness, i.e. down to about 50% instead of 65% dry matter content in cakes, and cakes are typically diluted to a lesser extent to some 10-15% units higher consistency, i.e. 20-25% instead of 10%, in following filtration.

From this example with silica rich green liquors it is understood that process parameters may change even between green liquors from the same type of origin, i.e. softwood processes and also in comparison with hardwood processes as they all may have different process set up as of cooking and/or bleaching, all contributing to different characteristics of the green liquor. However, the inventive concept is still applicable for those other types of green liquors of different origin, and provide for same improved relative effect in reduced residual alkali levels in lime sent to lime kiln and reduced TRS emissions in flue gases from lime kiln.

While the present invention has been described in accordance with preferred compositions and embodiments, it is to be understood that certain substitutions and alterations may be made thereto without departing from the spirit and scope of the following claims.

We claim:

1. A method of extracting strong white liquor and lime mud with low residual alkali content from causticized liquor emanating from causticizing vessels in the recovery process of a pulp mill, comprising the following steps in sequence:
    adding burnt lime to green liquor to start a causticizing reaction to produce a causticized liquor;
    feeding the causticized liquor to a first part of a vat of a pressurized disc filter wherein the first part of the vat has a first set of filter discs and a separate first filtrate reception system, thereafter
    extracting strong white liquor from the causticized liquor in the first filtrate reception system by passing the liquid part of the causticized liquor through filter media of the first set of filter discs, while collecting the residual lime particles of the causticized liquor as a first lime cake on the face of the filter media of the first set of filter discs and using no wash water on the formed first lime cake on the filter media, thereafter
    scraping off at least a part of the first lime cake from the face of the filter media on the first set of filter discs, wherein the dry matter content of the scraped off first lime cake is higher than 50 wt-% and collecting the scraped off first lime cake in a first lime cake collection system while diluting the scraped off first lime cake with a suitable low alkali liquid to a dry matter content of the diluted first lime cake slurry less than 25 wt-%;
    feeding at least a part of the diluted first lime cake slurry to a second part of the vat of the pressurized disc filter wherein the second part has a second set of filter discs and a separate second filtrate reception system, thereafter
    extracting weak white liquor from the diluted first lime cake slurry in the second filtrate reception system by passing the liquid part of the diluted first lime cake slurry through filter media of the second set of filter discs, while collecting the residual lime particles of the diluted first lime cake slurry as a second lime cake on the face of the filter media of the second set of filter discs and using wash water on the formed second lime cake on the filter media in order to displace residual alkali in said second lime cake, thereafter
    scraping off at least a part of the second lime cake from the face of the filter media on the second set of filter discs, wherein the dry matter content of the scraped off second lime cake is higher than 50 wt-% and collecting the scraped off second lime cake in a second lime cake collection system while diluting the scraped off second lime cake with a low alkali liquid to a dry matter content of the diluted second lime cake less than 25 wt-% and passing the diluted second lime cake slurry to at least one lime mud thickening stage before feeding the thickened lime mud to a lime kiln.

2. A method according to claim 1, wherein the method further comprises pressurizing the pressurized disc filter with at least 0.7 bar above atmospheric pressure in both the first and second vat part.

3. A method according to claim 2, wherein the method further comprises pressurizing the pressurized disc filter with at least 1.0 bar above atmospheric pressure in both the first and second vat part.

4. A method according to claim 3, wherein the method further comprises providing the pressurized disc filter with a number of filter discs in the first set of filter discs greater than the number of filter discs in the second set of filter discs.

5. A method according to claim 3, wherein the method further comprises establishing a level of the causticized liquor in the first vat part that is higher than the level of diluted first lime cake slurry in the second vat part, thus obtaining a height difference ($\Delta H$) between liquid surfaces in first and second vat part.

6. A method according to claim 3, wherein the method further comprises using the extracted weak white liquor from the diluted first lime cake slurry as at least part of the suitable low alkali liquid used as dilution liquid diluting the scraped off first lime cake.

7. A method according to claim 3, wherein the method further comprises feeding a part of the diluted first lime cake slurry to a subsequent lime mud thickening stage before feeding the thickened lime mud to a lime kiln.

* * * * *